INVENTORS
John Boyd and
Richard A. Bice.

Patented Feb. 22, 1949

2,462,158

UNITED STATES PATENT OFFICE 2,462,158

METHOD OF PRODUCING ARTICLES OF MANUFACTURE

John Boyd, Pittsburgh, and Richard A. Bice, Wilkinsburg, Pa., assignors to Westinghouse Electric Corporation, East Pittsburgh, Pa., a corporation of Pennsylvania Application September 15, 1943, Serial No. 502,498

5 Claims. (Cl. 154—121)

1

This invention relates to composition articles of manufacture and, in particular, to the method of producing such composition articles of manufacture with specific reference to the production of composition bearing materials.

Laminated fibrous material impregnated with heat hardening resinoid has been employed in bearing assemblies, particularly in the marine industry, for many years. In this industry, the bearings are usually formed of a plurality of machined staves disposed and retained in a suitable housing, water being usually employed as the lubricating medium for the bearing.

In practice it is found that the lubricating medium causes the bearing staves to swell and become distorted, the bearing staves often buckling inwardly to the degree that the internal bearing surface of the assembly is distorted and the bearing material actually seizes the shaft (not shown) which is disposed to run in the bearing.

An object of this invention is the provision of a method for so treating resin bonded laminated fibrous material as to materially reduce dimensional changes in such material when thereafter subjected to immersion in liquids.

Another object of this invention is the provision of a method for producing bearing staves of resin bonded laminated fibrous material which have little dimensional changes when immersed in liquids.

Figure 1:
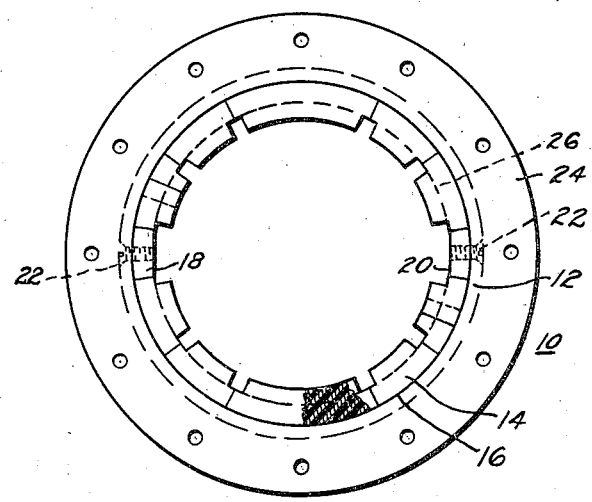
Figure 2:
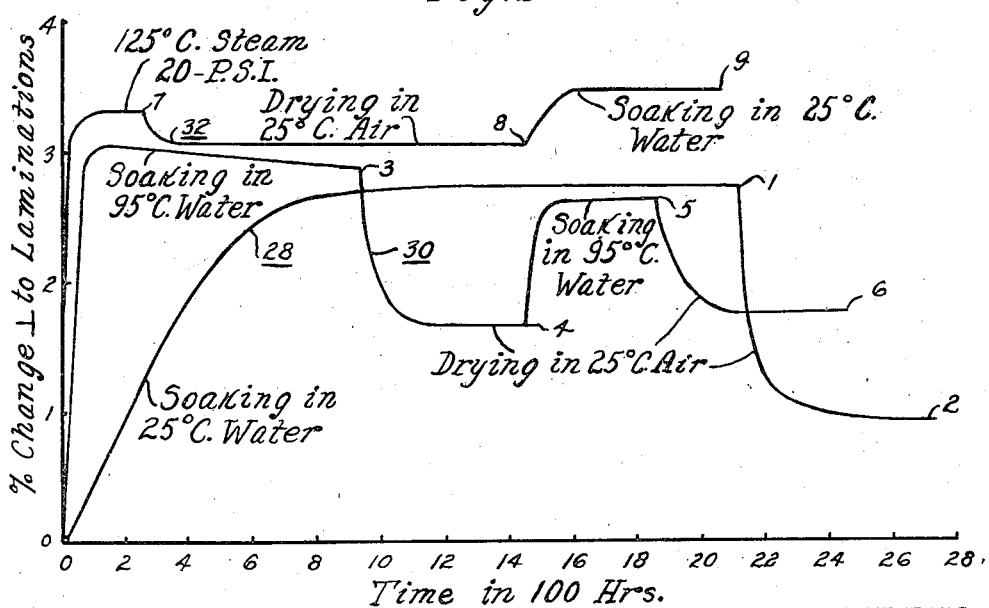

Other objects of this invention will become apparent from the following description when taken in conjunction with the accompanying drawing, in which:

Figure 1 is a view in elevation and partly in section of a bearing assembly, the composition staves of which have been treated in accordance with this invention; and Fig. 2 is a graph, the curves of which are illustrative of the effect of the method of this invention on the bearing material.

Referring to Fig. 1, this invention is illustrated by reference to bearing assembly 10 comprising a housing 12 of metal or other suitable material and bearing staves 14 disposed to seat on the bore 16 of the housing between keeper strips 18 and 20 which are secured to the housing by means of the screws 22. End flanges 24 and 26 are carried by the housing to facilitate the mounting of the staves and keeper strips therein and to aid in mounting the assembly.

The keeper strips 18 and 20 may be of any suitable material such as metal or of laminated fibrous material impregnated with a resinous binder. Preferably the keeper strips 18 and 20 are disposed diametrically opposite one another and extend for the length of the housing.

As illustrated, the staves 14 are divided into two groups disposed to seat on opposite sides of the keeper strips 18 and 20. Each of the staves and the keeper strips are preferably formed of laminated fibrous material such as duck or other cloth fabrics impregnated with a resinous binder, such as a phenolic, urea, vinyl or other resin or resinous mixtures consolidated under heat and pressure into a strong body. Such materials are well known in the art and need not be further described herein, it being apparent that the choice of the fibrous material and the resinous binder utilized therewith depends upon the characteristics which it is required to develop in the bearing material. Preferably the staves 14 are so designed that the laminations of the fibrous material extend substantially perpendicular to the base of the staves to present edges at the bearing surface.

In accordance with this invention, the blocks (not shown) of laminated fibrous material impregnated with resin from which the staves 14 are to be formed are subjected to a treatment which will effect a reduction in the tendency of the bearing material to have dimensional changes when the material is immersed in a lubricant such as water. The method utilized in effecting such results is to immerse the block consolidated from the fibrous material and the resinous binder in an aqueous medium for a period of time sufficient to effect the swelling thereof, dry the material, and to thereafter machine the block to the required shape and size of the article or stave which is to be produced therefrom.

Referring to Fig. 2, the curves 28, 30, and 32 are representative of the percent change in the size of the block of impregnated fibrous material perpendicular to the faces of the laminations of the block when subjected to different treatments as will be described hereinafter for different periods of time. These curves are all directed to the percent change perpendicular to the faces of the laminations of the block as it has been found that the percent change in the dimensions in a direction parallel to the faces of the laminations of the block when subjected to the treatments to be described hereinafter is never more than .3%, being so slight as to be negligible. Further, since the staves 14 which are formed from the blocks of impregnated fibrous material are mounted in the housing 12 of the bearing assembly with their laminations perpendicular to the bore of the housing, the dimensional changes perpendicular to the faces of the laminations constitute the dimensional changes which have a detrimental effect on the bearing.

Referring to Fig. 2, curve 28 is representative of the treatment consisting of soaking the block of impregnated fibrous material in water at room temperature for a period of time sufficient to effect the swelling thereof and thereafter drying the block in air. As shown, when soaked in water at a temperature of 25° C., the block of impregnated fibrous material has a maximum dimensional change of about 2.75% in the direction perpendicular to the faces of the laminations after having been immersed in the water for a period of time of about 1000 hours. The prolonging of the immersion treatment, as represented by the portion of the curve extending from 0 to 1, has little, if any, effect on the dimensional changes of the block of impregnated fibrous material. When dried in air at a temperature of 25° C., as represented by the portion 1—2 of the curve 28, the block of impregnated fibrous material has a contraction, the contraction, however, being to a smaller degree than the initial swelling imparted thereto by the soaking in the water.

As illustrated by the curve 28, the block of impregnated fibrous material is about 1% larger after the immersion and drying treatment described than in the original state. Therefore, after the block is machined to the required shape and size of the article of manufacture such as the bearing stave, when the article of manufacture is again subjected to an immersion in an aqueous medium, the maximum change in dimension of the machined article will be considerably smaller than if the article had not been given the described immersion and drying treatment.

That the temperature of the aqueous medium utilized for the immersion treatment has a definite effect on the speed of the dimensional changes is readily apparent by comparison of the curves 30 and 32 with the curve 28 of Fig. 2. The portion 0—3 of the curve 30 is representative of the percent change of the dimensions of a block of impregnated fibrous material perpendicular to the faces of the laminations when soaked in water heated and maintained at a temperature of 95°. As will be apparent, the maximum change in dimension in the block when immersed in the heated water is obtained in approximately $\frac{1}{10}$ of the time that the maximum change is obtained where the block is immersed in water at 25° C. as illustrated by curve 28. After the block is maintained in the heated water for a period of time sufficient to effect the swelling thereof, as represented by the portion 0—3 of curve 30, the block is then dried in air at 25° C., as represented by the portion 3—4 of curve 30. When thus dried, a slow decrease in the dimensional changes is effected until the block becomes stabilized against further change in dimensions by continued drying. The dried block of impregnated fibrous material retains a major part of the increase in size imparted thereto by the immersion in the hot aqueous medium.

Where desired, the block of impregnated fibrous material can be further stabilized against changes in dimension by repeating the step of immersing the block in water at a temperature of 95° C., as represented by the portion 4—5 of the curve 30, and thereafter again drying the block in air at 25° C., as represented by the portion 5—6 of the curve 30. It is to be noted that the total percent change in the dimension perpendicular to the faces of the laminations of the dried block, as represented by the flat portion of the section 5—6 of the curve 30, is somewhat larger than the total percent change of the dried block of impregnated fibrous material represented by the flat portion of the section 3—4 of the curve 30. Thus, after the block is machined to the required shape and size of the article of manufacture, if it is immersed in water, the percent change in dimensions of such article will be considerably smaller if the block is subjected to the alternate immersing and drying treatment represented by the whole of curve 30 instead of being subjected to only the first immersion and drying treatment, represented by the portion 0—4 of curve 30.

In another embodiment of this invention, the block of impregnated fibrous material is placed in an autoclave and subjected to an immersion therein in steam under pressure. In a particular embodiment, the aqueous medium employed is steam at a temperature of 125° C. and a pressure of 20 pounds per square inch. The curve 32 of Fig. 2 is illustrative of the percent change in the dimensions of the block perpendicular to the faces of the laminations, the portion 0—7 of curve 32 being representative of the swelling of the block when subjected to the aqueous medium described, whereas the portion 7—8 is representative of the reduction in the changes of the dimensions when the swollen block is dried in air at a temperature of 25° C. In this embodiment, as in the embodiment in which water at a temperature of 95° C. is employed, the percent change in the dimensions perpendicular to the faces of the laminations becomes a maximum in a much shorter period of time than where the block of impregnated fibrous material is immersed in water at room temperature.

When the block of impregnated fibrous material which has been dried after having been subjected to the steam and pressure treatment is thereafter immersed in water at a temperature of 25° C., the composition material again swells as represented by the portion 8—9 of curve 32. The degree of swelling is slight however compared to the original total swelling caused by the treatment under pressure and steam. The material thus treated is less affected by the immersion in cold water (25° C.), than the material which is subjected to the soaking in water at 95° C.

After having been subjected to the immersion and drying treatments described hereinbefore, the block is readily machined to the required shape and size of the article of manufacture. In the bearing assembly illustrated in Fig. 1, where the staves 14 are formed from the blocks of impregnated fibrous material treated by immersing and drying them as described hereinbefore, it is found that a substantially uniform bearing pattern of the internal bearing surface is obtained where water is used as a lubricant for the bearing. This is because the staves are so stabilized by the immersion and drying treatment described that when again immersed in an aqueous medium, as where water is employed as the lubricant, there is so little effect of water on the staves that very little dimensional changes of the staves are encountered. The slight dimensional change which might be encountered in the treated staves is so small that it will not effect a buckling of the staves. The method of this invention, therefore, makes it possible to produce a more efficient bearing in that since little distortion is encountered, the bearing assembly will have a longer life.

Although this invention has been described with reference to a particular embodiment thereof, it is, of course, not to be limited thereto except insofar as is necessitated by the scope of the appended claims.

We claim as our invention:

1. In the method of producing an article of manufacture, in combination, immersing a block consolidated from laminated sheets of cloth fabric impregnated with a heat-hardening resinoid in a hot aqueous medium for a period of time sufficient to effect the swelling thereof perpendicular to the faces of the laminations, and thereafter drying the block, the dried block retaining a major part of the increase in size imparted thereto by the immersion in the hot aqueous medium.

2. In the method of producing an article of manufacture, in combination, immersing a block consolidated from laminated sheets of cloth fabric impregnated with a heat-hardening resinoid in a hot aqueous medium for a period of time sufficient to effect the swelling thereof perpendicular to the faces of the laminations, drying the block, the dried block retaining a major part of the increase in size imparted thereto by the immersion in the hot aqueous medium, and machining the dried block to the required shape and size of the article of manufacture.

3. In the method of producing an article of manufacture, in combination, alternately immersing a block consolidated from laminated sheets of cloth fabric impregnated with a heat-hardening resinoid in a hot aqueous medium for a period of time sufficient to effect the swelling thereof perpendicular to the faces of the laminations, and thereafter drying the block, the dried block retaining a major part of the increase in size imparted thereto by the first immersion in the hot aqueous medium.

4. In the method of producing a bearing stave, in combination, immersing a bearing material consolidated from laminated sheets of cloth fabric impregnated with a heat-hardening resinoid in steam at a temperature of about 125° C. at a pressure of about 20 pounds per square inch for a period of time sufficient to effect the swelling thereof perpendicular to the faces of the laminations, and thereafter drying the bearing material, the dried bearing material retaining a major part of the increase in size imparted thereto by the steam treatment.

5. In the method of producing a bearing stave, in combination, immersing a bearing material consolidated from laminated sheets of cloth fabric impregnated with a heat-hardening resinoid in water at a temperature of about 95° C. for a period of time sufficient to effect the swelling thereof perpendicular to the faces of the laminations, and thereafter drying the bearing material in air, the dried bearing material retaining a major part of the increase in size imparted thereto by the immersion.

JOHN BOYD.
RICHARD A. BICE.

REFERENCES CITED

The following references are of record in the file of this patent:

UNITED STATES PATENTS

| Number | Name | Date |
| --- | --- | --- |
| 53,610 | Hanvey | Apr. 3, 1866 |
| 1,021,676 | Howard | Mar. 26, 1912 |
| 1,757,892 | Wilson | May 6, 1930 |
| 1,987,694 | Mains | Jan. 15, 1935 |
| Re. 22,071 | Nevin | Apr. 14, 1942 |
| 2,302,711 | Oglesby | Nov. 24, 1942 |
| 2,338,480 | Auxier | Jan. 9, 1944 |
| 2,400,051 | Pasquier | May 7, 1946 |

FOREIGN PATENTS

| Number | Country | Date |
| --- | --- | --- |
| 765,181 | France | Mar. 19, 1934 |